United States Patent
Enomoto

(10) Patent No.: US 6,735,021 B2
(45) Date of Patent: May 11, 2004

(54) ZOOM LENS SYSTEM AND A FOCUSING METHOD THEREOF

(75) Inventor: Takashi Enomoto, Chiba (JP)

(73) Assignee: PENTAX Corporation, Tokyo (JP)

( * ) Notice: Subject to any disclaimer, the term of this patent is extended or adjusted under 35 U.S.C. 154(b) by 97 days.

(21) Appl. No.: 09/886,018

(22) Filed: Jun. 22, 2001

(65) Prior Publication Data

US 2002/0015236 A1 Feb. 7, 2002

(30) Foreign Application Priority Data

Jun. 23, 2000 (JP) ........................... 2000-189884

(51) Int. Cl.[7] .............................................. G02B 15/14
(52) U.S. Cl. ........................................ 359/689; 359/684
(58) Field of Search ................... 359/689, 683, 359/676

(56) References Cited

U.S. PATENT DOCUMENTS

| 5,270,866 A | 12/1993 | Oizumi et al. |
| 5,455,714 A | 10/1995 | Kohno |
| 5,574,599 A | 11/1996 | Hoshi et al. |
| 5,666,229 A | 9/1997 | Ohtake |
| 5,815,320 A | 9/1998 | Hoshi et al. |
| 5,850,312 A * | 12/1998 | Kato et al. .................. 359/689 |
| 5,969,880 A | 10/1999 | Hasushita et al. |
| 6,246,529 B1 | 6/2001 | Sensui |
| 6,282,378 B1 * | 8/2001 | Honda et al. .................. 396/79 |
| 6,456,442 B1 * | 9/2002 | Enomoto .................... 359/689 |

* cited by examiner

Primary Examiner—Scott J. Sugarman
(74) Attorney, Agent, or Firm—Greenblum & Bernstein, P.L.C.

(57) ABSTRACT

A zoom lens system includes a positive first lens group, a positive second lens group, and a negative third lens group. Upon zooming from the short toward the long focal length extremities, the three lens groups are moved independently along the optical axis so that the distance between the first and second lens groups increases, and the distance between the second and third lens groups decreases. The first lens group and the second lens group which are independently moved upon zooming are integrally moved upon focusing.

10 Claims, 12 Drawing Sheets

F_NO=5.6
-1.0  1.0
SPHERICAL
ABERRATION

CHROMATIC
ABERRATION

— d Line
······ g Line
– – C Line

W=28.5°
-0.05  0.05
LATERAL
CHROMATIC
ABERRATION

W=28.5°
-1.0  1.0
ASTIGMATISM

— S
– – M

W=28.5°
-5.0 (%) 5.0
DISTORTION

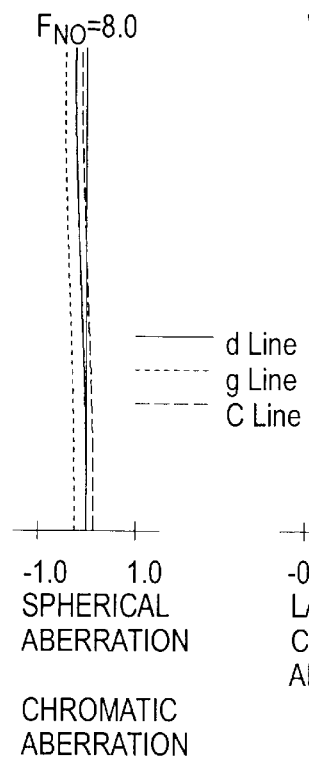
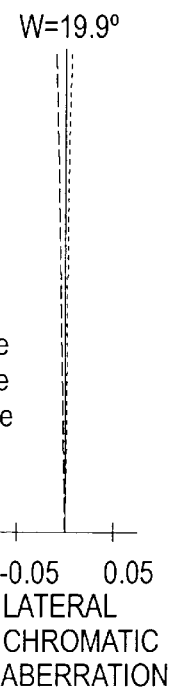
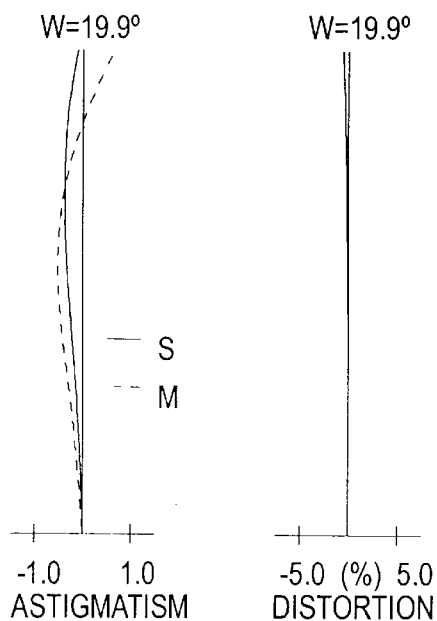
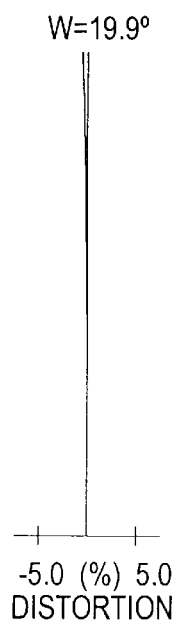
Fig.3A  Fig.3B  Fig.3C  Fig.3D
$F_{NO}=8.0$  W=19.9°  W=19.9°  W=19.9°
— d Line
····· g Line
— — C Line
— S
— — M
-1.0  1.0
SPHERICAL
ABERRATION
CHROMATIC
ABERRATION
-0.05  0.05
LATERAL
CHROMATIC
ABERRATION
-1.0  1.0
ASTIGMATISM
-5.0 (%) 5.0
DISTORTION
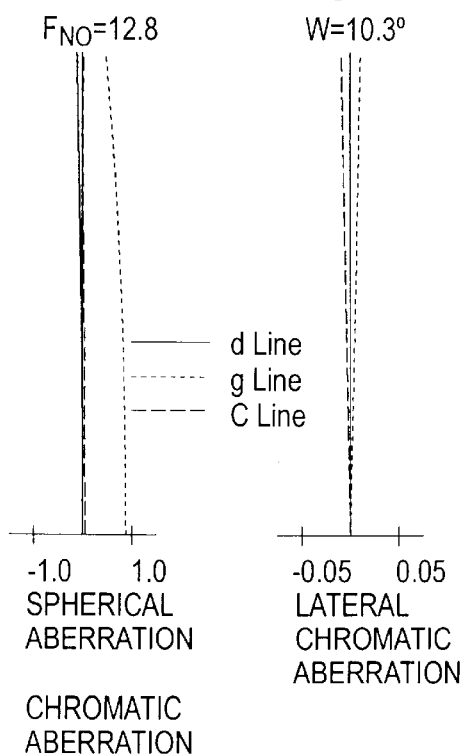
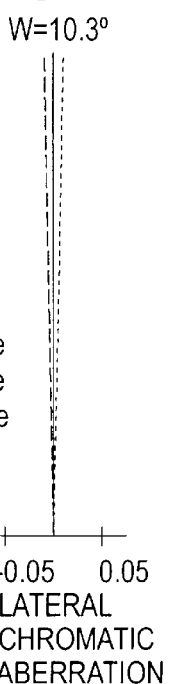
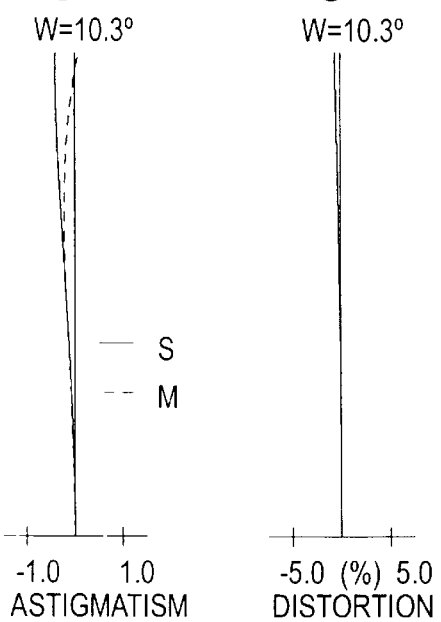
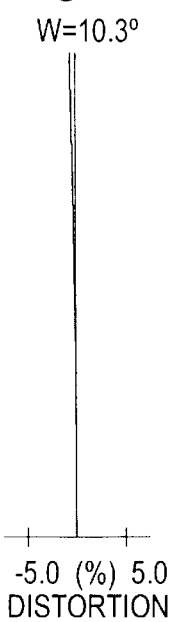
Fig.4A  Fig.4B  Fig.4C  Fig.4D
$F_{NO}=12.8$  W=10.3°  W=10.3°  W=10.3°
— d Line
····· g Line
— — C Line
— S
— — M
-1.0  1.0
SPHERICAL
ABERRATION
CHROMATIC
ABERRATION
-0.05  0.05
LATERAL
CHROMATIC
ABERRATION
-1.0  1.0
ASTIGMATISM
-5.0 (%) 5.0
DISTORTION

Fig.5A
$F_{NO}$=5.6
Fig.5B
Y=21.64
Fig.5C
Y=21.64
Fig.5D
Y=21.64
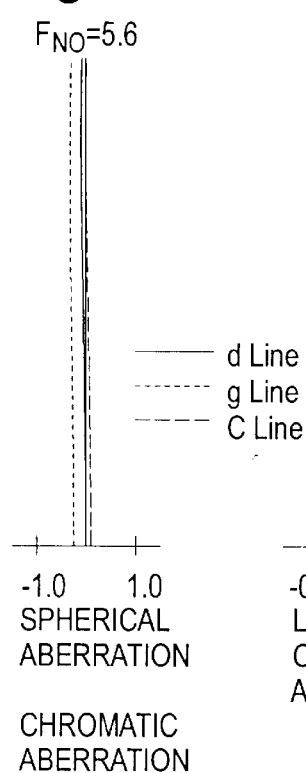
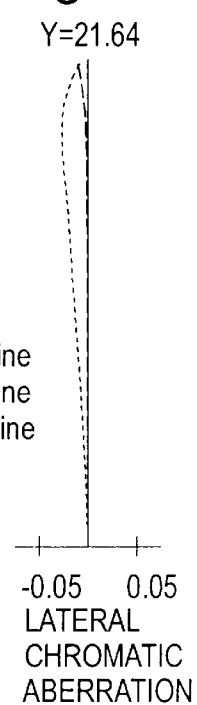
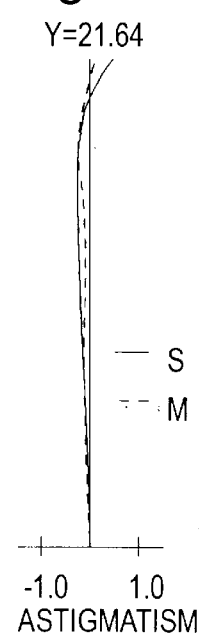
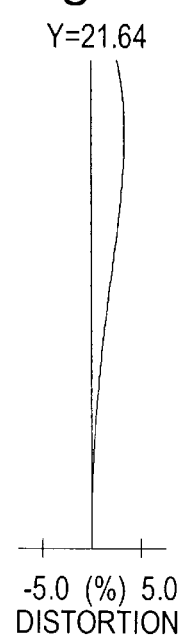
—— d Line
······ g Line
– – C Line
—— S
– – M
-1.0   1.0
SPHERICAL
ABERRATION
CHROMATIC
ABERRATION
-0.05   0.05
LATERAL
CHROMATIC
ABERRATION
-1.0   1.0
ASTIGMATISM
-5.0 (%) 5.0
DISTORTION
Fig.6A
$F_{NO}$=8.0
Fig.6B
Y=21.64
Fig.6C
Y=21.64
Fig.6D
Y=21.64
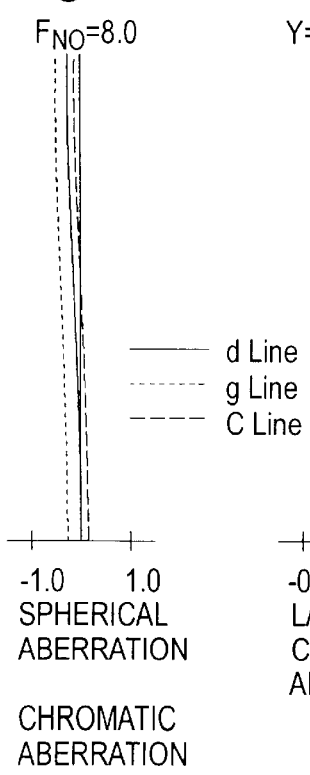
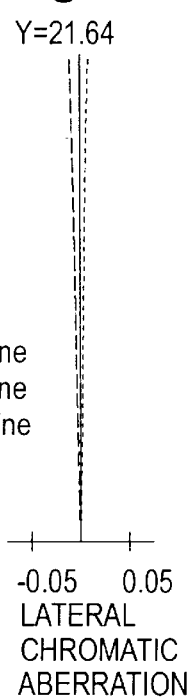
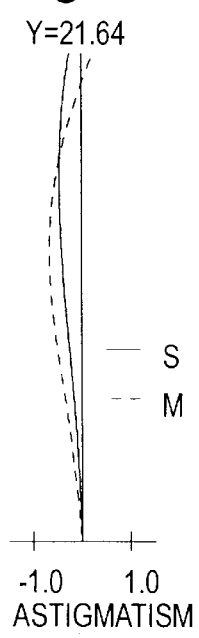
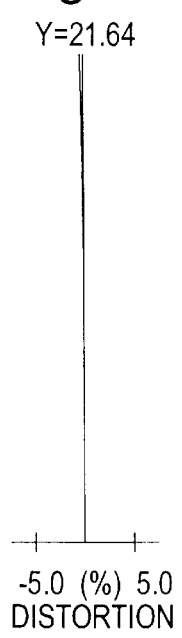
—— d Line
······ g Line
– – C Line
—— S
– – M
-1.0   1.0
SPHERICAL
ABERRATION
CHROMATIC
ABERRATION
-0.05   0.05
LATERAL
CHROMATIC
ABERRATION
-1.0   1.0
ASTIGMATISM
-5.0 (%) 5.0
DISTORTION $F_{NO}=12.8$ —— d Line
- - - - g Line
— — C Line

-1.0   1.0
SPHERICAL
ABERRATION

CHROMATIC
ABERRATION

Y=21.64

-0.05   0.05
LATERAL
CHROMATIC
ABERRATION

Y=21.64

—— S
- - M

-1.0   1.0
ASTIGMATISM

Y=21.64

-5.0 (%) 5.0
DISTORTION

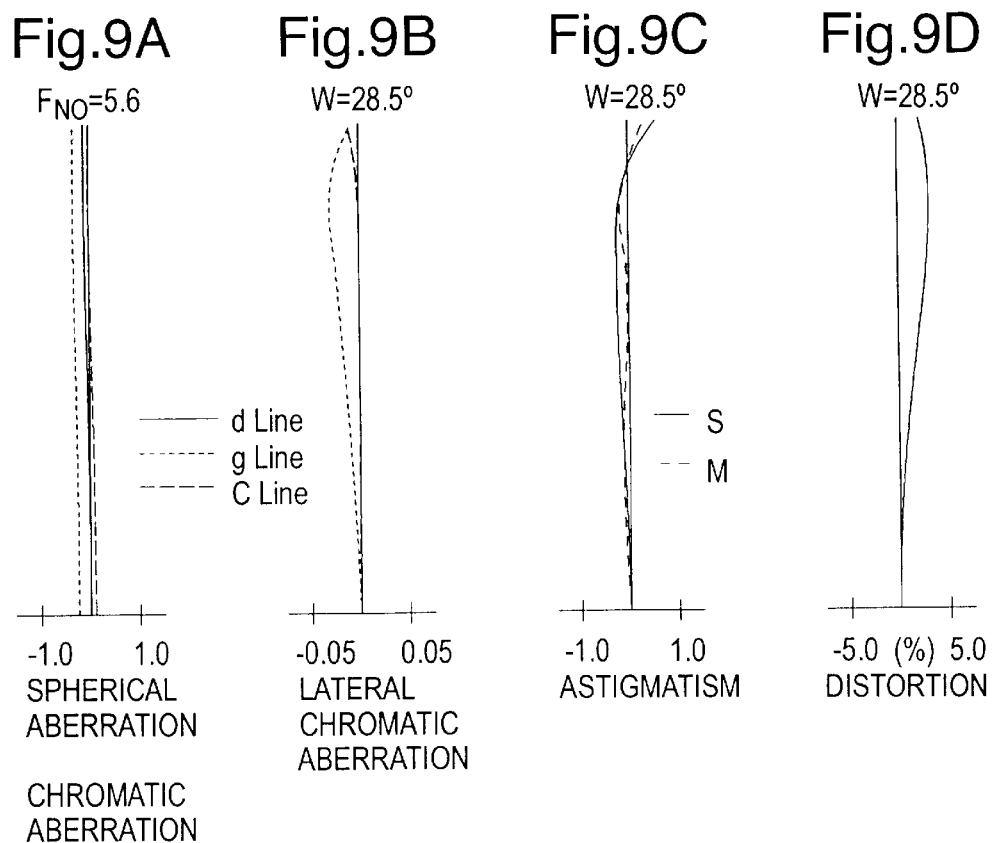
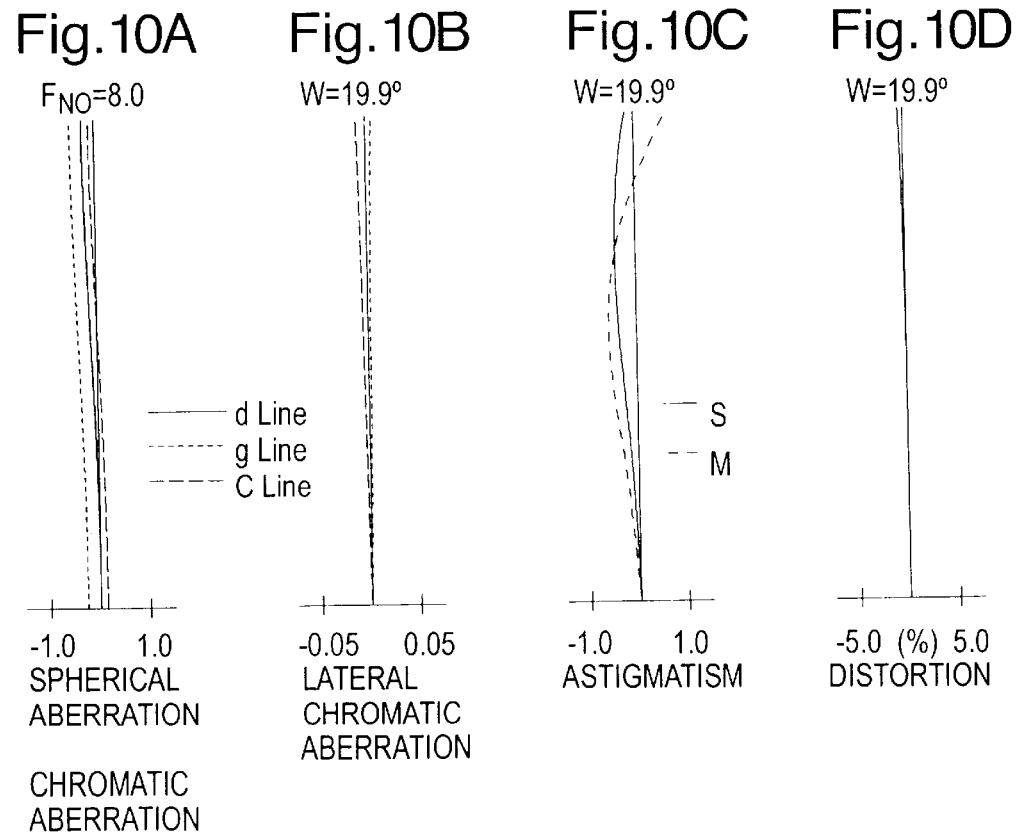

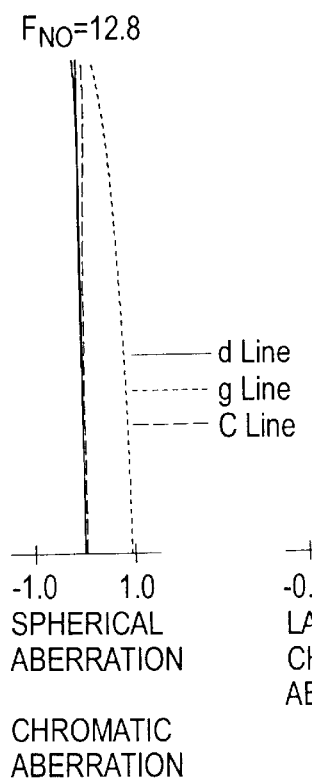
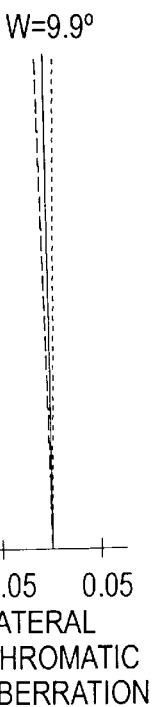
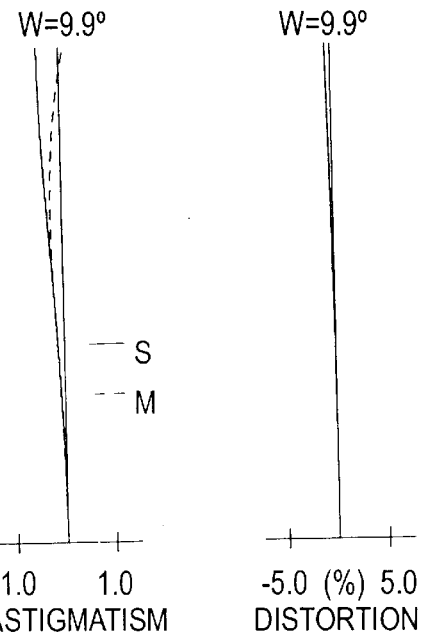
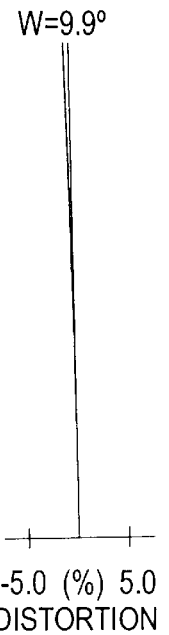
Fig.11A  FNO=12.8
Fig.11B  W=9.9°
Fig.11C  W=9.9°
Fig.11D  W=9.9°
-1.0  1.0
SPHERICAL ABERRATION
CHROMATIC ABERRATION
-0.05  0.05
LATERAL CHROMATIC ABERRATION
-1.0  1.0
ASTIGMATISM
-5.0 (%) 5.0
DISTORTION
d Line
g Line
C Line
S
M
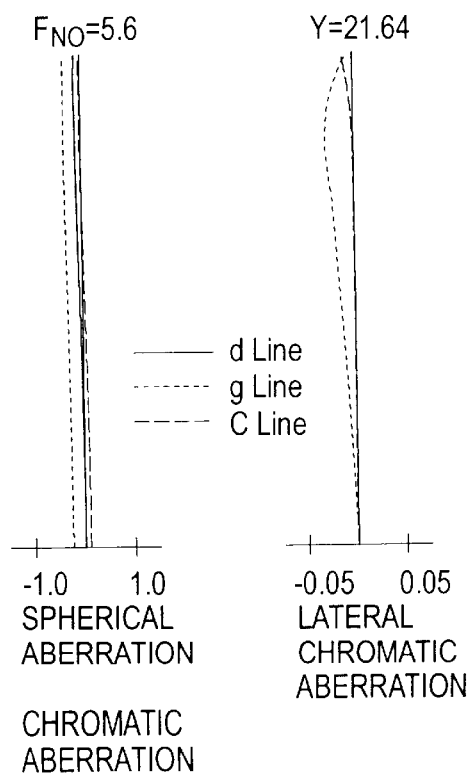
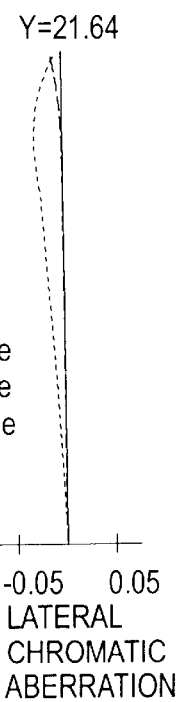
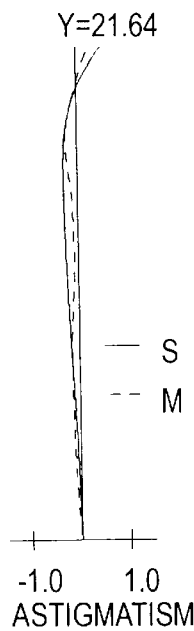
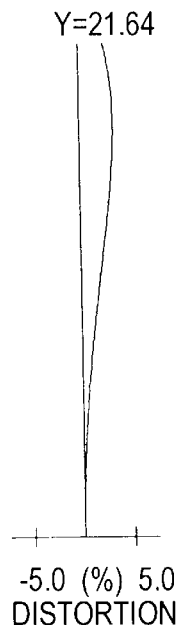
Fig.12A  FNO=5.6
Fig.12B  Y=21.64
Fig.12C  Y=21.64
Fig.12D  Y=21.64
-1.0  1.0
SPHERICAL ABERRATION
CHROMATIC ABERRATION
-0.05  0.05
LATERAL CHROMATIC ABERRATION
-1.0  1.0
ASTIGMATISM
-5.0 (%) 5.0
DISTORTION
d Line
g Line
C Line
S
M

Fig.13A
$F_{NO}$=8.0 d Line
g Line
C Line

-1.0  1.0
SPHERICAL
ABERRATION

CHROMATIC
ABERRATION

Fig.13B
Y=21.64

-0.05  0.05
LATERAL
CHROMATIC
ABERRATION

-1.0  1.0
ASTIGMATISM

Fig.13D
Y=21.64

-5.0 (%) 5.0
DISTORTION

Fig.14A
$F_{NO}$=12.8 d Line
g Line
C Line

-1.0  1.0
SPHERICAL
ABERRATION

CHROMATIC
ABERRATION

Fig.14B
Y=21.64

-0.05  0.05
LATERAL
CHROMATIC
ABERRATION

-1.0  1.0
ASTIGMATISM

Fig.14D
Y=21.64

-5.0 (%) 5.0
DISTORTION

Fig. 15
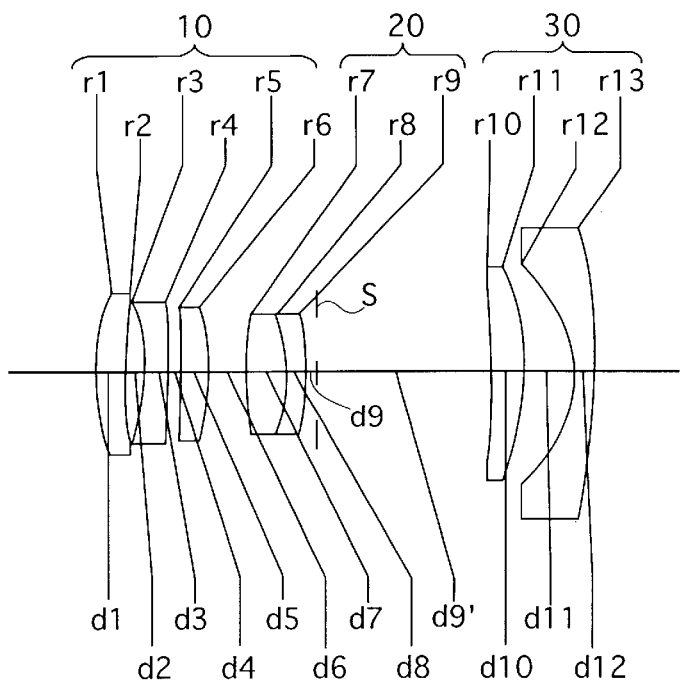
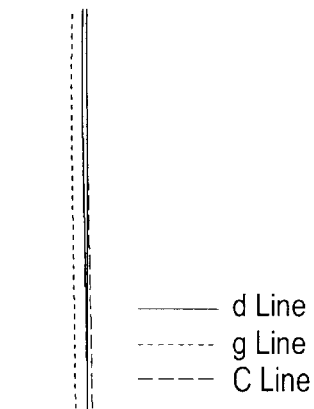
Fig.16A
$F_{NO}$=5.6
——— d Line
------- g Line
---- C Line
-1.0  1.0
SPHERICAL
ABERRATION
CHROMATIC
ABERRATION
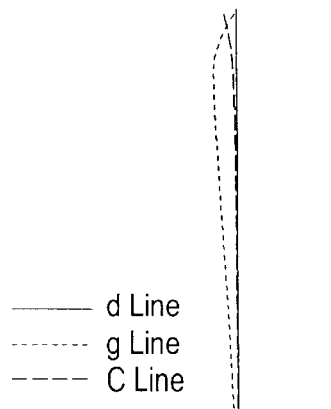
Fig.16B
W=28.4°
-0.05  0.05
LATERAL
CHROMATIC
ABERRATION
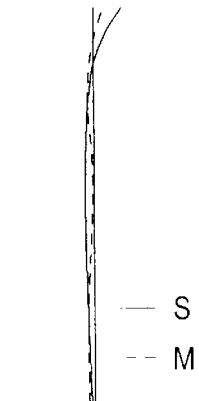
Fig.16C
W=28.4°
— S
-- M
-1.0  1.0
ASTIGMATISM
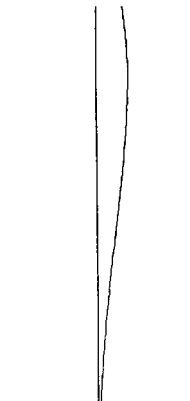
Fig.16D
W=28.4°
-5.0 (%) 5.0
DISTORTION

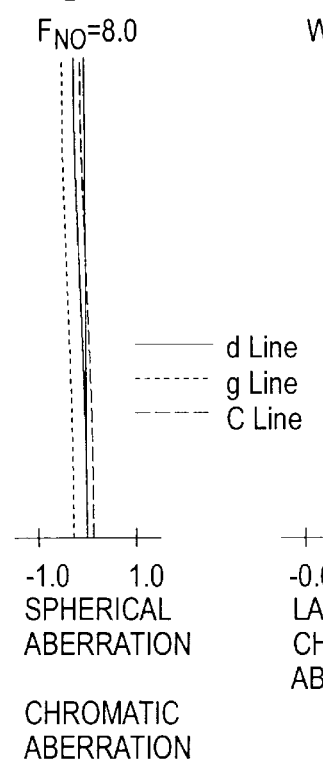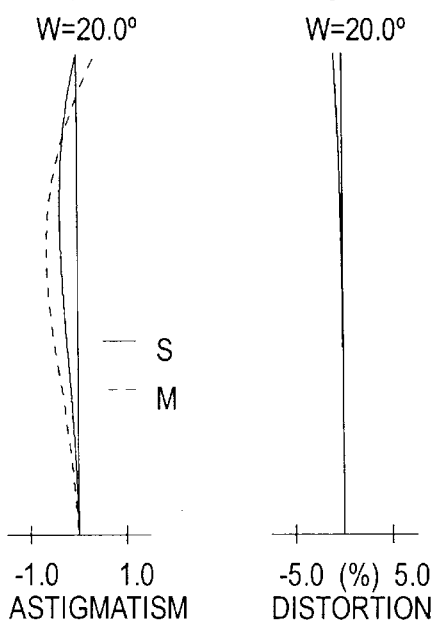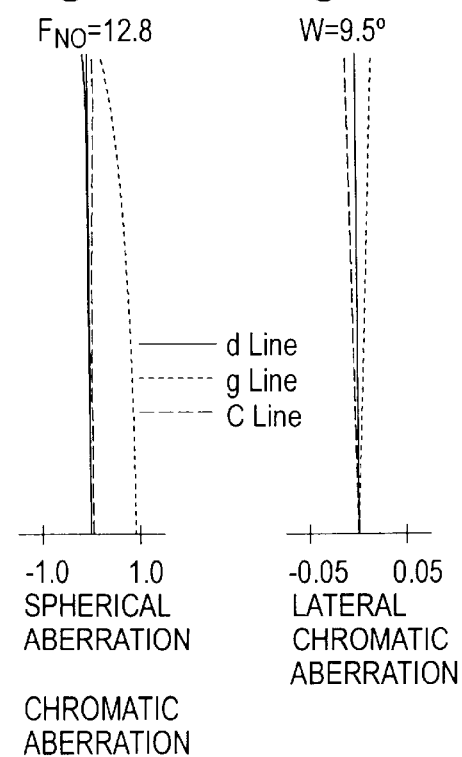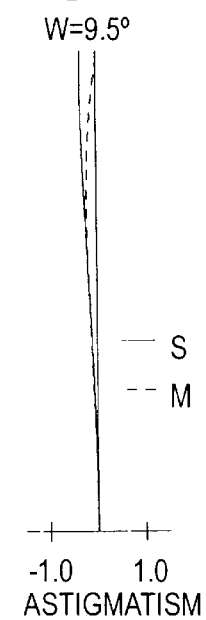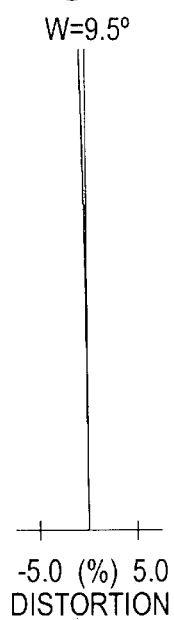
Fig. 17A  $F_{NO}=8.0$  —— d Line  ----- g Line  ---- C Line  -1.0  1.0  SPHERICAL ABERRATION  CHROMATIC ABERRATION
Fig. 17B  W=20.0°  -0.05  0.05  LATERAL CHROMATIC ABERRATION
Fig. 17C  W=20.0°  —— S  ---- M  -1.0  1.0  ASTIGMATISM
Fig. 17D  W=20.0°  -5.0 (%) 5.0  DISTORTION
Fig. 18A  $F_{NO}=12.8$  —— d Line  ----- g Line  ---- C Line  -1.0  1.0  SPHERICAL ABERRATION  CHROMATIC ABERRATION
Fig. 18B  W=9.5°  -0.05  0.05  LATERAL CHROMATIC ABERRATION
Fig. 18C  W=9.5°  —— S  ---- M  -1.0  1.0  ASTIGMATISM
Fig. 18D  W=9.5°  -5.0 (%) 5.0  DISTORTION

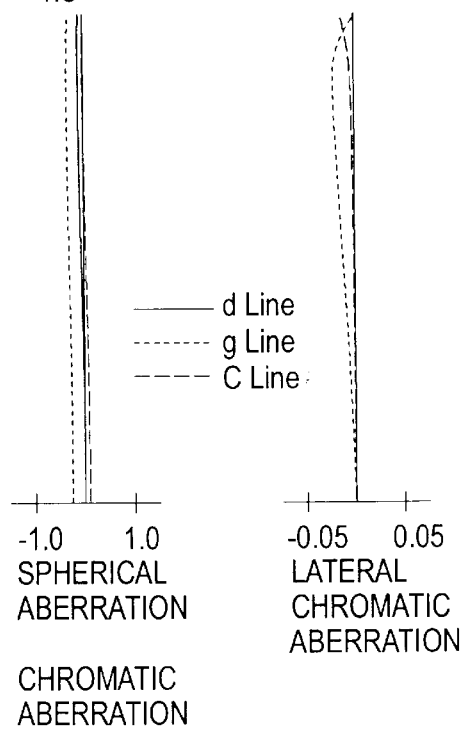
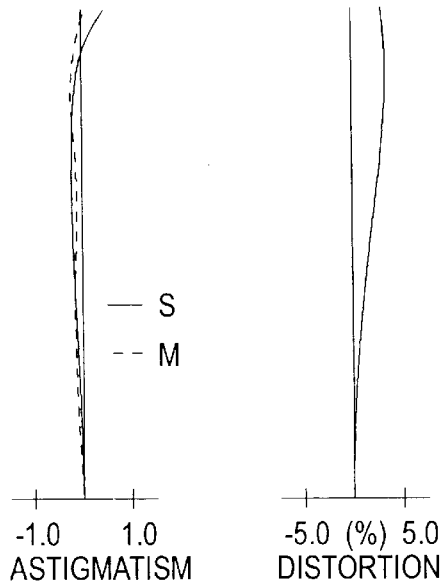
Fig.19A  F_{NO}=5.6  SPHERICAL ABERRATION CHROMATIC ABERRATION
Fig.19B  Y=21.64  LATERAL CHROMATIC ABERRATION
Fig.19C  Y=21.64  ASTIGMATISM
Fig.19D  Y=21.64  DISTORTION
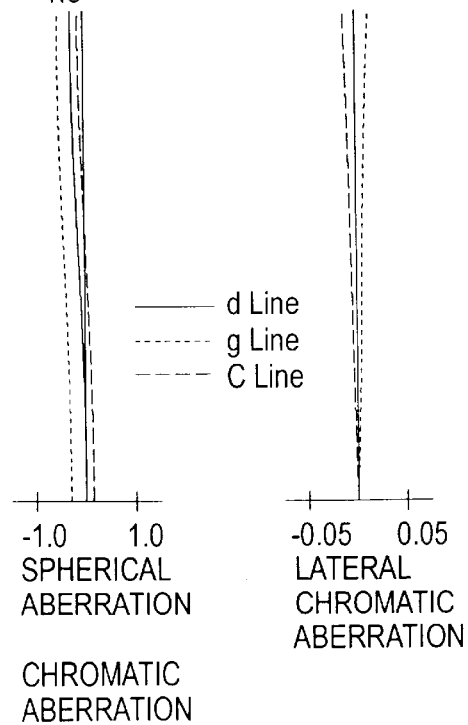
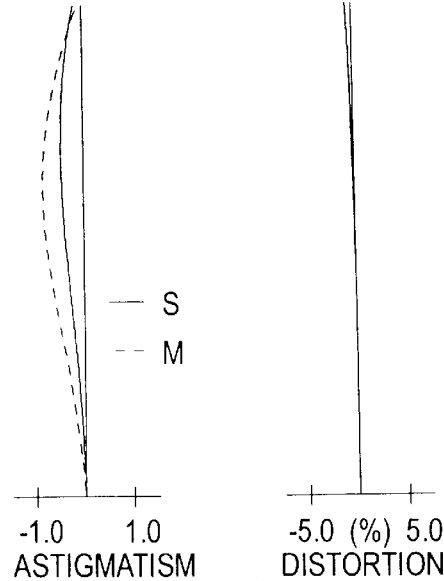
Fig.20A  F_{NO}=8.0  SPHERICAL ABERRATION CHROMATIC ABERRATION
Fig.20B  Y=21.64  LATERAL CHROMATIC ABERRATION
Fig.20C  Y=21.64  ASTIGMATISM
Fig.20D  Y=21.64  DISTORTION $F_{NO}=12.8$  Y=21.64  Y=21.64  Y=21.64 d Line
g Line
C Line

— S
- - M

-1.0  1.0     -0.05  0.05    -1.0  1.0     -5.0 (%) 5.0
SPHERICAL    LATERAL         ASTIGMATISM   DISTORTION
ABERRATION   CHROMATIC
             ABERRATION
CHROMATIC
ABERRATION

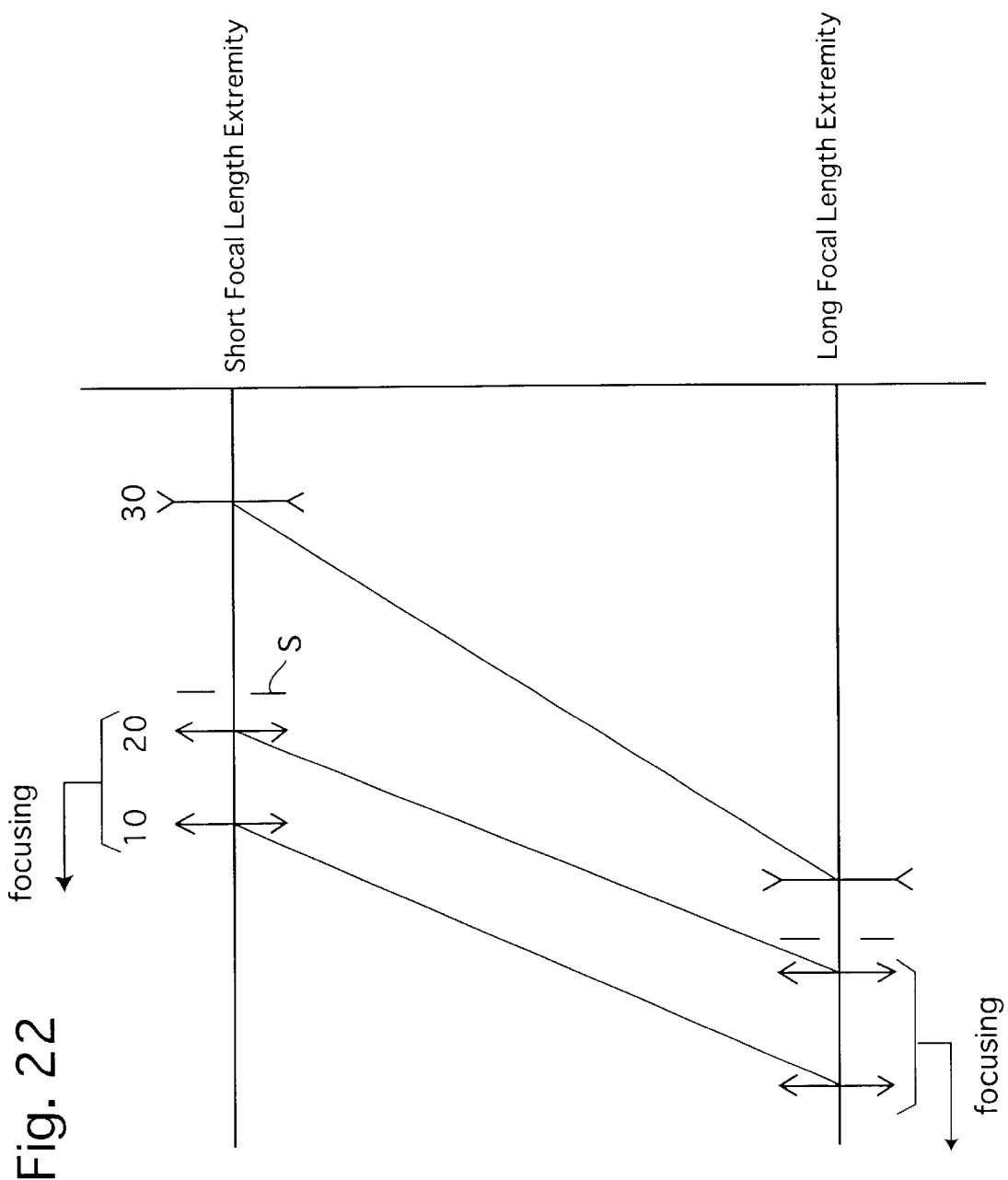

ZOOM LENS SYSTEM AND A FOCUSING METHOD THEREOF

BACKGROUND OF THE INVENTION

1. Field of the Invention

The present invention relates to a zoom lens system for a compact camera, and in particular, relates to a focusing method of the zoom lens system.

2. Description of the Related Art

Unlike a zoom lens system for a single lens reflex (SLR) camera, a zoom lens system for a compact camera does not require a longer back focal distance behind the photographing lens system. Accordingly, in a compact camera, a telephoto type zoom lens system has been employed, while in a SLR camera, a retrofocus zoom lens system has been employed for the purpose of securing a back focal distance.

In such a zoom lens system of a compact camera, a high zoom ratio has been required in recent years, i.e., the shorter focal length at the short focal length extremity, and the longer focal length at the long focal length extremity. Accordingly, a three-lens-group zoom lens system is frequently employed. In this three-lens-group zoom lens system, zooming is performed by moving each of three lens groups independently along the optical axis; and focusing is performed by moving at least one lens group, which usually is the first lens group or the second lens group, along the optical axis. In order to achieve miniaturization of a three-lens-group zoom lens system of this type, it is essential to decrease the overall length of the zoom lens system, the diameter and thickness of each lens group. However, if the number of lens elements is reduced for the purpose of reducing the overall thickness of each lens group, the number of lens elements of a lens group for focusing (hereinafter, focusing lens group) is also reduced. As a result, with respect to any focal length in the entire zooming range defined by the short focal length extremity and the long focal length extremity, it becomes difficult to adequately correct aberrations at focal lengths, with respect to an infinite photographing distance over the closest photographing distance. This tendency becomes more noticeable when a zoom ratio is set higher. Therefore in order to correct aberrations adequately over the entire photographing range (an infinite photographing distance to the closest photographing distance), the number of lens elements has to be increased. Consequently, miniaturization of the three-lens-group zoom lens system cannot be attained.

SUMMARY OF THE INVENTION

It is an object of the present invention to provide a miniaturized telephoto-type three-lens-group zoom lens system which is constituted by a small number of lens elements, and by which aberrations can be adequately corrected.

The present invention is based on conception that the number of lens elements of the focusing lens group can substantially be increased if the first lens group and the second lens group are integrally moved upon focusing. According to this arrangement, the correcting of aberrations over the entire photographing range becomes easier. This conception is materialized by utilizing a zoom lens system including a positive first lens group, a positive second lens group, and a negative third lens group, in this order from the object. Upon zooming from the short focal length extremity toward the long focal length extremity, the three lens groups are moved independently along the optical axis so that the distance between the first lens group and the second lens group increases, and the distance between the second lens group and the third lens group decreases.

In other words, under the above-explained zoom lens system, the first lens group and the second lens group which are independently moved upon zooming are arranged to move integrally upon focusing.

The zoom lens system preferably satisfies the following condition:

$$10 < K_F < 25 \quad (1)$$

wherein $K_F = (f_T/f_{FT})^2$;

$f_T$ designates the focal length of the entire zoom lens system at the long focal length extremity, and $f_{FT}$ designates the combined focal length of the first lens group and the second lens group at the long focal length extremity.

The zoom lens system can satisfy the following condition:

$$0.1 < (d_{12T} - d_{12W})/f_W < 0.3 \quad (2)$$

wherein $d_{12T}$ designates the distance between the most image-side surface of the first lens group and the most object-side surface of the second lens group, at the long focal length extremity;

$d_{12W}$ designates the distance between the most image-side surface of the first lens group and the most object-side surface of the second lens group, at the short focal length extremity; and $f_W$ designates the focal length of the entire zoom lens system at-the short focal length extremity.

For example, if an attempt is made to constitute the first lens group by three lens elements, and the second lens group by two lens elements, the correcting of aberrations over the entire photographing range can relatively be made adequately.

According to another aspect of the present invention, there is provided a focusing method for the zoom lens system including a positive first lens group, a positive second lens group, and a negative third lens group, in this order from the object; and the method including the following steps:

upon zooming from the short focal length extremity toward the long focal length extremity, the three lens groups are moved independently along the optical axis so that the distance between the first lens group and the second lens group increases, and the distance between the second lens group and the third lens group decreases; and upon focusing, the first lens group and the second lens group are integrally moved.

The present disclosure relates to subject matter contained in Japanese Patent Application No. 2000-189884 (filed on Jun. 23, 2000) which is expressly incorporated herein by reference in its entirety.

BRIEF DESCRIPTION OF THE DRAWINGS

The invention will be discussed below in detail with reference to the accompanying drawings, in which:

FIGS. 3A, 3B, 3C and 3D show aberrations occurred in the lens arrangement shown in FIG. 1, at an intermediate focal length, when an object at an infinite photographing distance is in an in-focus state;

FIGS. 4A, 4B, 4C and 4D show aberrations occurred in the lens arrangement shown in FIG. 1, at the long focal length extremity, when an object at an infinite photographing distance is in an in-focus state;

FIGS. 5A, 5B, 5C and 5D show aberrations occurred in the lens arrangement shown in FIG. 1, at the short focal length extremity, when an object at a finite photographing distance is in an in-focus state;

FIGS. 6A, 6B, 6C and 6D show aberrations occurred in the lens arrangement shown in FIG. 1, at an intermediate focal length, when an object at a finite photographing distance is in an in-focus state;

FIGS. 9A, 9B, 9C and 9D show aberrations occurred in the lens arrangement shown in FIG. 8, at the short focal length extremity, when an object at an infinite photographing distance is in an in-focus state;

FIGS. 10A, 10B, 10C and 10D show aberrations occurred in the lens arrangement shown in FIG. 8, at an intermediate focal length, when an object at an infinite photographing distance is in an in-focus state;

FIGS. 11A, 11B, 11C and 11D show aberrations occurred in the lens arrangement shown in FIG. 8, at the long focal length extremity, when an object at an infinite photographing distance is in an in-focus state;

FIGS. 12A, 12B, 12C and 12D show aberrations occurred in the lens arrangement shown in FIG. 8, at the short focal length extremity, when an object at a finite photographing distance is in an in-focus state;

FIGS. 13A, 13B, 13C and 13D show aberrations occurred in the lens arrangement shown in FIG. 8, at an intermediate focal length, when an object at a finite photographing distance is in an in-focus state;

FIGS. 14A, 14B, 14C and 14D show aberrations occurred in the lens arrangement shown in FIG. 8, at the long focal length extremity, when an object at a finite photographing distance is in an in-focus state;

FIG. 15 shows a lens arrangement of the zoom lens system according to a third embodiment of the present invention;

FIGS. 16A, 16B, 16C and 16D show aberrations occurred in the lens arrangement shown in FIG. 15, at the short focal length extremity, when an object at an infinite photographing distance is in an in-focus state;

FIGS. 17A, 17B, 17C and 17D show aberrations occurred in the lens arrangement shown in FIG. 15, at an intermediate focal length, when an object at an infinite photographing distance is in an in-focus state;

FIGS. 18A, 18B, 18C and 18D show aberrations occurred in the lens arrangement shown in FIG. 15, at the long focal length extremity, when an object at an infinite photographing distance is in an in-focus state;

FIGS. 19A, 19B, 19C and 19D show aberrations occurred in the lens arrangement shown in FIG. 15, at the short focal length extremity, when an object at a finite photographing distance is in an in-focus state;

FIGS. 20A, 20B, 20C and 20D show aberrations occurred in the lens arrangement shown in FIG. 15, at an intermediate focal length, when an object at a finite photographing distance is in an in-focus state;

FIG. 22 is a schematic view of lens-group moving paths for the zoom lens system according to the present invention.

DESCRIPTION OF THE PREFERRED EMBODIMENTS

Figure 1:
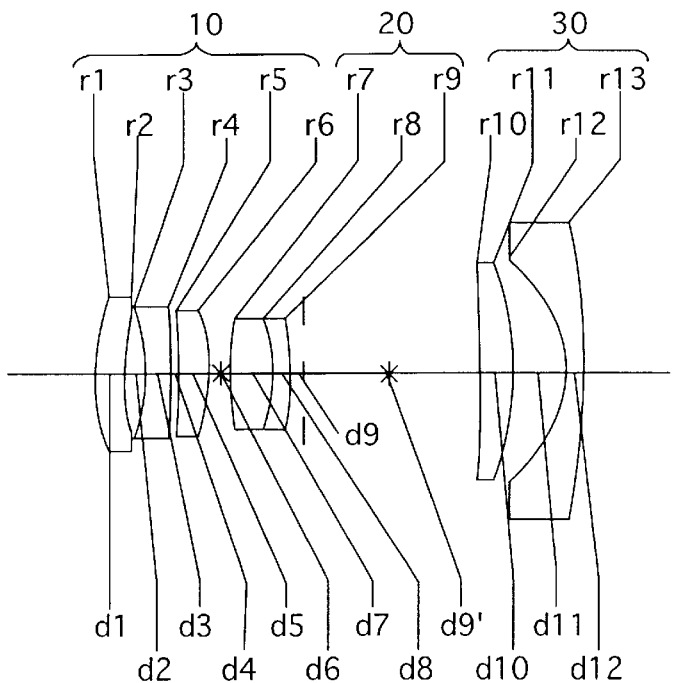
FIG. 1 shows a lens arrangement of the zoom lens system according to a first embodiment of the present invention.
Figure 2A:
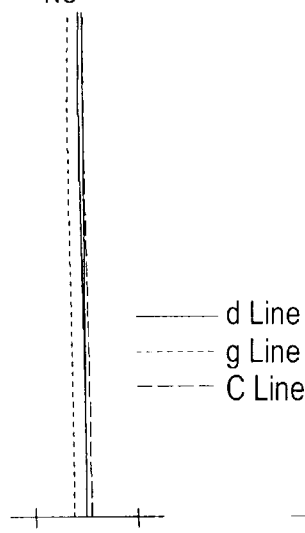
FIGS. 2A, 2B, 2C and 2D show aberrations occurred in the lens arrangement shown in FIG. 1, at the short focal length extremity, when an object at an infinite photographing distance is in an in-focus state.
Figure 2B:
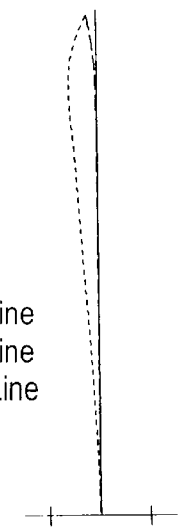
Figure 2C:
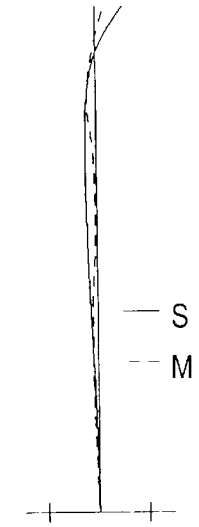
Figure 2D:
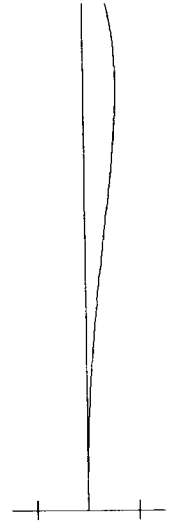
Figure 7A:
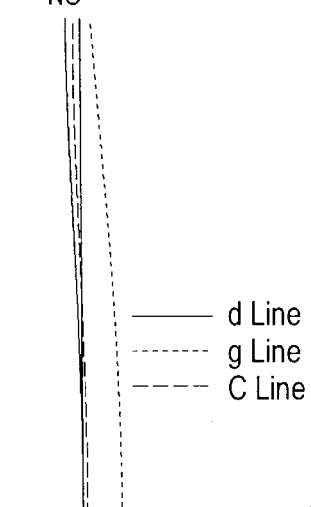
FIGS. 7A, 7B, 7C and 7D show aberrations occurred in the lens arrangement shown in FIG. 1, at the long focal length extremity, when an object at a finite photographing distance is in an in-focus state.
Figure 7B:
Figure 7C:
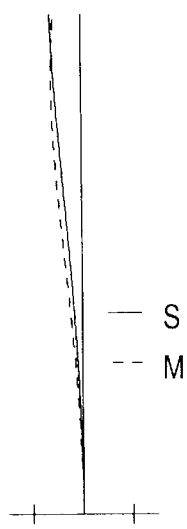
Figure 7D:
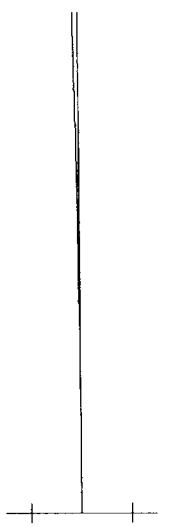

The zoom lens system, as shown in the lens-group moving paths of FIG. 22, includes a positive first lens group 10, a positive second lens group 20, and a negative third lens group 30, in this order from the object. In this three-lens-group zoom lens system, upon zooming from the short focal length extremity toward the long focal length extremity, all the lens groups move toward the object so that the distance between the first lens group 10 and the second lens group 20 increases, and the distance between the second lens group 20 and the third lens group 30 decreases. A diaphragm S is provided between the second lens group 20 and the third lens group 30, and moves together with the second lens group 20 upon zooming. On the other hand, upon focusing when the first lens group 10 and the second lens group 20 are integrally moved, the diaphragm S is made stationary.

In the above three-lens-group zoom lens system, focusing is performed by integrally moving the first lens group 10 and the second lens group 20. More concretely, at the time of zooming, the first lens group 10 and the second lens group 20 are independently moved, so that according to the change of the focal lengths, the distance between these lens groups also varies. When focusing is performed by integrally moving the first and second lens groups, the distance therebetween which has been set through zooming is being maintained. Due to this arrangement in which the first lens group 10 and the second lens group 20 which are independently moved upon zooming is integrally moved upon focusing, the number of lens elements for the focusing lens group can substantially be secured, though the number of lens elements for each lens group is small. Accordingly, compared with a case where focusing is performed only by the first lens group 10 or the second lens group 20, the correcting of aberrations over the entire photographing range can be made easier. More importantly, according to this arrangement, two opposing requirement-s can be satisfied, i.e., one is for the correcting of aberrations in connection with a higher zoom ratio, and the other is for decreasing the number of lens elements in connection with miniaturization of a zoom lens system.

Condition (1) specifies the sensitivity of the focusing lens group (i.e., the first lens group 10 and the second lens group 20). By satisfying this condition, the traveling distance of the focusing lens group can be reduced, and miniaturization of the zoom lens system can be attained.

If $K_F$ exceeds the upper limit of condition (1), the sensitivity of the focusing lens group becomes too high, so that a precise focusing operation becomes difficult.

If $K_F$ exceeds the lower limit of condition (1), the traveling distance of the focusing lens group becomes too long.

Condition (2) specifies the distance between the first lens group 10 and the second lens group 20 at the short focal length extremity and the long focal length extremity respectively. By satisfying this condition, the diameters and overall lengths of these lens groups can be reduced.

If $(d_{12T}-d_{12W})/f_W$ exceeds the upper limit of condition (2), the overall length of these lens groups become longer, so that miniaturization of these lens groups cannot be attained.

If $(d_{12T}-d_{12W})/f_W$ exceeds the lower limit of condition (2), the correcting of field curvature at focal lengths in the entire zooming range defined by the short focal length extremity and the long focal length extremity becomes difficult.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, Fno designates the F-number, f designates the focal length of the entire zoom lens system, W designates the half angle-of-view (°), $f_B$ designates the back focal distance, r designates the radius of curvature, d designates the lens-element thickness or distance between lens elements, Nd designates the refractive index of the d-line, and ν designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10} \ldots$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

FIGS. 1 through 7D show the first embodiment of a zoom lens system. FIG. 1 shows the lens arrangement thereof, i.e., the first lens group 10 includes a positive meniscus lens element having the convex surface facing toward the object, a negative meniscus lens element having the concave surface facing toward the object, and a positive meniscus lens element having the concave surface facing toward the object, in this order from the object; the second lens group 20 includes cemented lens elements constituted by a biconvex positive lens element and a negative meniscus lens element having the concave surface facing toward the object; and the third lens group 30 includes a positive meniscus lens element having the concave surface facing toward the object and a negative meniscus lens element having the concave surface facing toward the object, in this order from the object. FIGS. 2A through 2D show aberrations occurred in the lens arrangement shown in FIG. 1, at the short focal length extremity, when an object at an infinite photographing distance is in an in-focus state. FIGS. 3A through 3D show aberrations occurred in the lens arrangement shown in FIG. 1, at an intermediate focal length, when an object at an infinite photographing distance is in an in-focus state. FIGS. 4A through 4D show aberrations occurred in the lens arrangement shown in FIG. 1, at the long focal length extremity, when an object at an infinite photographing distance is in an in-focus state. FIGS. 5A through 5D show aberrations occurred in the lens arrangement shown in FIG. 1, at the short focal length extremity, when an object at a finite photographing distance (object-image distance u=2.45 m) is in an in-focus state. FIGS. 6A through 6D show aberrations occurred in the lens arrangement shown in FIG. 1, at an intermediate focal length, when an object at a finite photographing distance (object-image distance u=2.45 m) is in an in-focus state. FIGS. 7A through 7D show aberrations occurred in the lens arrangement shown in FIG. 1, at the long focal length extremity, when an object at a finite photographing distance (object-image distance u=2.45 m) is in an in-focus state. Table 1 shows the numerical values of the first embodiment. Upon focusing, the first lens group 10 and the second lens group 20 are integrally moved with respect to the diaphragm S which is made stationary. In Table 1, the distance corresponding to the surface No.9, i.e., d9 is the distance between the diaphragm S and the most image-side surface of the second lens group 20; the distance corresponding to the diaphragm S is the distance (d9') between the diaphragm and the most object-side surface of the third lens group 30. The same can be applied to the second and third embodiments.

TABLE 1

$F_{NO}$ = 1:5.6–8.0–12.8
f = 39.00–60.00–120.00 (Zoom Ratio: 3.08)
W = 28.5–19.9–10.3
$f_B$ = 8.58–24.68–71.16

| Surface No. | r | d | Nd | ν |
|---|---|---|---|---|
| 1 | 16.139 | 2.27 | 1.49868 | 68.5 |
| 2 | 32.056 | 1.51 | — | — |
| 3* | −12.893 | 1.80 | 1.84700 | 35.5 |
| 4 | −53.925 | 0.60 | — | — |
| 5 | −98.890 | 2.40 | 1.54781 | 45.5 |
| 6 | −12.406 | 1.67–5.30–8.00 | — | — |
| 7 | 26.337 | 3.16 | 1.49824 | 59.2 |
| 8 | −11.661 | 1.40 | 1.80400 | 46.6 |
| 9 | −25.327 | 1.00–1.00–1.00 (INFI) | — | — |
|   |  | 1.33–1.35–1.37 (FINI) | — | — |
| Diaphragm | ∞ | 13.40–7.47–1.69 | — | — |
| 10* | −62.385 | 2.53 | 1.58547 | 29.9 |
| 11* | −29.045 | 3.97 | — | — |
| 12 | −10.473 | 1.50 | 1.74701 | 53.6 |
| 13 | −49.666 | — | — | — |

Aspherical surface data (the aspherical surface coefficients not indicated are zero (0.00)):

| Surf. No. | K | A4 | A6 | A8 |
|---|---|---|---|---|
| 3 | 0.00 | 0.8599 × 10⁻⁵ | −0.1556 × 10⁻⁶ | — |
| 10 | 0.00 | −0.1447 × 10⁻⁴ | 0.1655 × 10⁻⁵ | −0.5578 × 10⁻⁸ |
| 11 | 0.00 | −0.8858 × 10⁻⁴ | 0.1346 × 10⁻⁵ | −0.6474 × 10⁻⁸ |

INFI: Infinite Photographing Distance
FINI: Finite Photographing Distance
*designates the aspherical surface which is rotationally symmetrical with respect to the optical axis.

[Embodiment 2]

Figure 8:
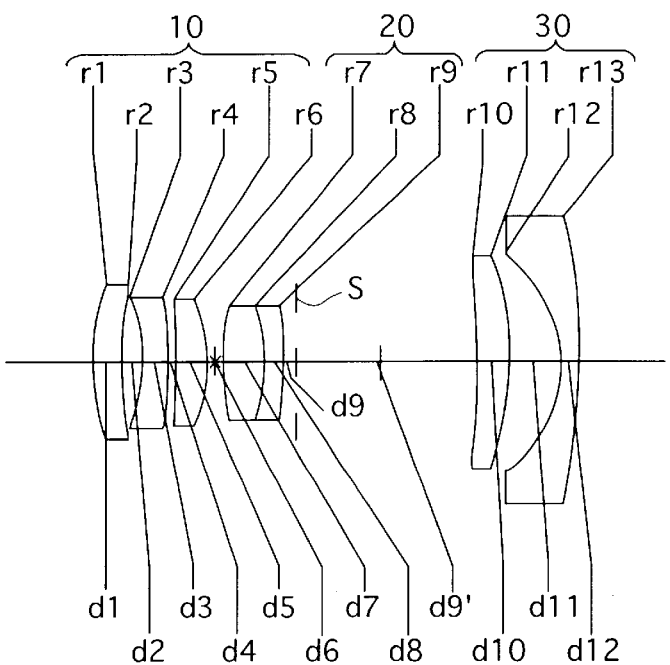
FIG. 8 shows a lens arrangement of the zoom lens system according to a second embodiment of the present invention.
Figure 21A:
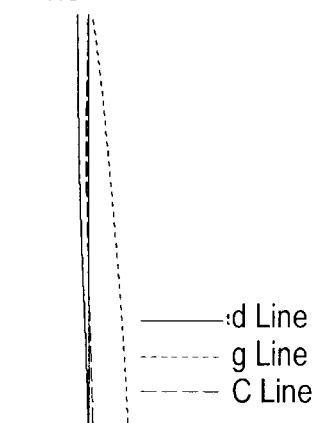
FIGS. 21A, 21B, 21C and 21D show aberrations occurred in the lens arrangement shown in FIG. 15, at the long focal length extremity, when an object at a finite photographing distance is in an in-focus state.
Figure 21B:
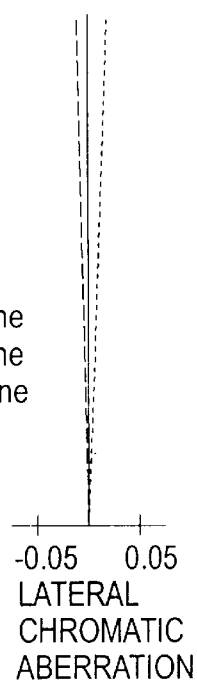
Figure 21C:
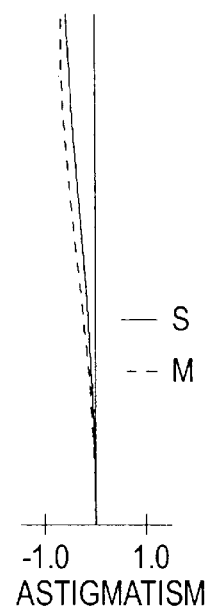
Figure 21D:
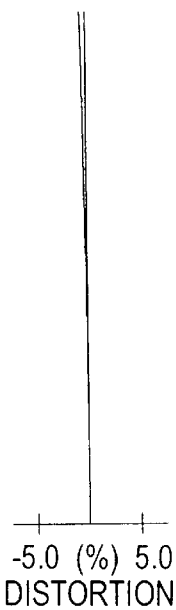

FIGS. 8 through 14D show the second embodiment of a zoom lens system. FIG. 8 shows the lens arrangement thereof. FIGS. 9A through 9D show aberrations occurred in the lens arrangement shown in FIG. 8, at the short focal length extremity, when an object at an infinite photographing distance is in an in-focus state. FIGS. 10A through 10D show aberrations occurred in the lens arrangement shown in FIG. 8, at an intermediate focal length, when an object at an infinite photographing distance is in an in-focus state. FIGS. 11A through 11D show aberrations occurred in the lens arrangement shown in FIG. 8, at the long focal length extremity, when an object at an infinite photographing distance is in an in-focus state. FIGS. 12A through 12D show aberrations occurred in the lens arrangement shown in FIG. 8, at the short focal length extremity, when an object at a finite photographing distance (object-image distance u=2.45 m) is in an in-focus state. FIGS. 13A through 13D show aberrations occurred in the lens arrangement shown in FIG. 8, at an intermediate focal length, when an object at a finite photographing distance (object-image distance u=2.45 m) is in an in-focus state. FIGS. 14A through 14D show aberrations occurred in the lens arrangement shown in FIG. 8, at the long focal length extremity, when an object at a finite photographing distance (object-image distance u=2.45 m) is in an in-focus state. Table 2 shows the numerical values of the second embodiment. The basic lens arrangement of the second embodiment is the same as the first embodiment.

TABLE 2

$F_{NO}$ = 1:5.6–8.0–12.8
f = 39.00–60.00–125.00 (Zoom Ratio: 3.21)
W = 28.5–19.9–9.9
$f_B$ = 8.60–24.90–75.78

| Surface No. | r | d | Nd | ν |
|---|---|---|---|---|
| 1 | 16.851 | 2.27 | 1.48068 | 71.4 |
| 2 | 34.968 | 1.58 | — | — |
| 3* | −12.894 | 1.80 | 1.84699 | 36.2 |
| 4 | −52.929 | 0.60 | — | — |
| 5 | −103.055 | 2.40 | 1.54567 | 45.9 |
| 6 | −12.455 | 1.45–5.07–8.00 | — | — |
| 7 | 27.571 | 3.16 | 1.49814 | 60.4 |
| 8 | −11.911 | 1.40 | 1.80400 | 46.6 |
| 9 | −24.984 | 1.00–1.00–1.00 (INFI) | — | — |
|   |   | 1.33–1.35–1.38 (FINI) | — | — |
| Diaphragm | ∞ | 13.83–7.80–1.70 | — | — |
| 10* | −60.108 | 2.53 | 1.58547 | 29.9 |
| 11* | −27.576 | 3.93 | — | — |
| 12 | −10.473 | 1.50 | 1.75115 | 53.3 |
| 13 | −49.458 | — | — | — |

Aspherical surface data (the aspherical surface coefficients not indicated are zero (0.00)):

| Surf. No. | K | A4 | A6 | A8 |
|---|---|---|---|---|
| 3 | 0.00 | $0.5859 \times 10^{-5}$ | $-0.1207 \times 10^{-6}$ | — |
| 10 | 0.00 | $-0.7942 \times 10^{-5}$ | $0.1216 \times 10^{-5}$ | $-0.3847 \times 10^{-8}$ |
| 11 | 0.00 | $-0.8412 \times 10^{-4}$ | $0.1103 \times 10^{-5}$ | $-0.7373 \times 10^{-8}$ |

INFI: Infinite Photographing Distance
FINI: Finite Photographing Distance
*designates the aspherical surface which is rotationally symmetrical with respect to the optical axis.

[Embodiment 3]

FIGS. 15 through 21D show the third embodiment of a zoom lens system. FIG. 15 shows the lens arrangement thereof. FIGS. 16A through 16D show aberrations occurred in the lens arrangement shown in FIG. 15, at the short focal length extremity, when an object at an infinite photographing distance is in an in-focus state. FIGS. 17A through 17D show aberrations occurred in the lens arrangement shown in FIG. 15, at an intermediate focal length, when an object at an infinite photographing distance is in an in-focus state. FIGS. 18A through 18D show aberrations occurred in the lens arrangement shown in FIG. 15, at the long focal length extremity, when an object at an infinite photographing distance is in an in-focus state. FIGS. 19A through 19D show aberrations occurred in the lens arrangement shown in FIG. 15, at the short focal length extremity, when an object at a finite photographing distance (object-image distance u=2.45 m) is in an in-focus state. FIGS. 20A through 20D show aberrations occurred in the lens arrangement shown in FIG. 15, at an intermediate focal length, when an object at a finite photographing distance (object-image distance u=2.45 m) is in an in-focus state. FIGS. 21A through 21D show aberrations occurred in the lens arrangement shown in FIG. 15, at the long focal length extremity, when an object at a finite photographing distance (object-image distance u=2.45 m) is in an in-focus state. Table 3 shows the numerical values of the second embodiment. The basic lens arrangement of the second embodiment is the same as the first embodiment.

TABLE 3

$F_{NO}$ = 1:5.6–8.0–12.8
f = 39.00–60.00–130.00 (Zoom Ratio: 3.33)
W = 28.4–20.0–9.5
$f_B$ = 8.40–23.84–76.07

| Surface No. | r | d | Nd | ν |
|---|---|---|---|---|
| 1 | 16.641 | 2.27 | 1.48000 | 71.5 |
| 2 | 34.215 | 1.67 | — | — |
| 3* | −13.110 | 1.80 | 1.84700 | 37.4 |
| 4 | −55.63 | 0.60 | — | — |
| 5 | −91.778 | 2.40 | 1.53851 | 47.3 |
| 6 | −12.532 | 2.72–6.71–9.66 | — | — |
| 7 | 24.484 | 3.16 | 1.49431 | 60.9 |
| 8 | −11.935 | 1.40 | 1.80400 | 46.6 |
| 9 | −25.261 | 1.00–1.00–1.00 (INFI) | — | — |
|   |   | 1.33–1.35–1.38 (FINI) | — | — |
| Diaphragm | ∞ | 13.33–7.66–1.69 | — | — |
| 10* | −71.308 | 2.53 | 1.58547 | 29.9 |
| 11* | −28.102 | 4.00 | — | — |
| 12 | −10.473 | 1.50 | 1.76541 | 52.3 |
| 13 | −59.959 | — | — | — |

Aspherical surface data (the aspherical surface coefficients not indicated are zero (0.00)):

| Surf. No. | K | A4 | A6 | A8 |
|---|---|---|---|---|
| 3 | 0.00 | $0.7637 \times 10^{-5}$ | $-0.1366 \times 10^{-6}$ | — |
| 10 | 0.00 | $-0.2704 \times 10^{-4}$ | $0.1289 \times 10^{-5}$ | $-0.3353 \times 10^{-8}$ |
| 11 | 0.00 | $-0.1052 \times 10^{-3}$ | $0.1053 \times 10^{-5}$ | $-0.5925 \times 10^{-8}$ |

INFI: Infinite Photographing Distance
FINI: Finite Photographing Distance
*designates the aspherical surface which is rotationally symmetrical with respect to the optical axis.

The numerical values of each condition of each embodiment are shown in Table 4.

TABLE 4

|  | Embod. 1 | Embod. 2 | Embod. 3 |
|---|---|---|---|
| Condition (1) | 11.55 | 17.79 | 19.30 |
| Condition (2) | 0.16 | 0.17 | 0.18 |

As can be understood from Table 4, each embodiment satisfies each condition. Furthermore, as can be understood from the aberration diagrams, the various aberrations can be adequately corrected.

According to the above description, a miniaturized telephoto-type three-lens-group zoom lens system, which is constituted by a small number of lens elements, and by which aberrations can be adequately corrected, can be obtained.

What is claimed is:
1. A zoom lens system comprising:
   a positive first lens group;
   a positive second lens group; and a negative third lens group, the first lens group, the second lens group and the third lens group being positioned, along an optical axis of the zoom lens system, in this order from an object;

wherein zooming from a short focal length toward a long focal length comprises moving said first, second and third lens groups along the optical axis, so that a distance between said first lens group and said second lens group increases, and a distance between said second lens group and said third lens group decreases; and wherein focusing comprises moving said first lens group and said second lens group, while said third lens group remains stationary.

2. A method for focusing a zoom lens system, comprising a positive first lens group, a positive second lens group and a negative third lens group, positioned in this order from an object along an optical axis of the zoom lens system, said method comprising:

moving said first lens group, said second group and said third lens group along the optical axis for zooming from a short focal length to a long focal length, the moving comprising increasing a distance between said first lens group and said second lens group and decreasing a distance between said second lens group and said third lens group; and moving said first lens group and said second lens group, while not moving said third lens group, for focusing.

3. A zoom lens system comprising:

a positive first lens group;

a positive second lens group; and a negative third lens group, the first lens group, the second lens group and the third lens group being positioned in this order from an object, along an optical axis of the zoom lens system;

wherein zooming from a short focal length toward a long focal length comprises moving said first, second and third lens groups along the optical axis, so that a distance between said first lens group and said second lens group increases, and a distance between said second lens group and said third lens group decreases;

wherein focusing comprises integrally moving said first lens group and said second lens group; and wherein the zoom lens system satisfies the following condition:

$$10 < K_F > 25$$

wherein, $K_F = (f_T/f_{FT})^2$;

$f_T$ designates a focal length of the zoom lens system at a long focal length extremity; and $f_{FT}$ designates a combined focal length of said first lens group and said second lens group at the long focal length extremity.

4. A zoom lens system comprising:

a positive first lens group;

a positive second lens group; and a negative third lens group, the first lens group, the second lens group and the third lens group being positioned in this order from an object, along an optical axis of the zoom lens system;

wherein zooming from a short focal length toward a long focal length comprises moving said first, second and third lens groups along the optical axis, so that a distance between said first lens group and said second lens group increases, and a distance between said second lens group and said third lens group decreases;

wherein focusing comprises integrally moving said first lens group and said second lens group; and wherein the zoom lens system satisfies the following condition:

$$0.1 < (d_{12T} - d_{12W})/f_W > 0.3$$

wherein, $d_{12T}$ designates a distance between a most image-side surface of said first lens group and a most object-side surface of said second lens group, at a long focal length extremity;

$d_{12W}$ designates a distance between the most image-side surface of said first lens group and the most object-side surface of said second lens group, at a short focal length extremity; and $f_W$ designates a focal length of the zoom lens system at the short focal length extremity.

5. A zoom lens system comprising:

a positive first lens group, comprising three lens elements;

a positive second lens group, comprising two lens elements; and a negative third lens group, the first lens group, the second lens group and the third lens group being positioned, in this order from an object, along an optical axis of the zoom lens system;

wherein zooming from a short focal length toward a long focal length comprises moving said first, second and third lens groups along the optical axis, so that a distance between said first lens group and said second lens group increases, and a distance between said second lens group and said third lens group decreases; and wherein focusing comprises integrally moving said first lens group and said second lens group.

6. The zoom lens system according to claim 1, wherein said first lens group and said second lens group are integrally moved for focusing.

7. The method for focusing a zoom lens system according to claim 2, wherein moving said first lens group and said second lens group for focusing comprises an integral movement.

8. The method for focusing a zoom lens system according to claim 2, wherein the zoom lens system satisfies the following condition:

$$10 < K_F > 25$$

wherein, $K_F = (f_T/f_{FT})^2$;

$f_T$ designates a focal length of the zoom lens system at a long focal length extremity; and $f_{FT}$ designates a combined focal length of said first lens group and said second lens group at the long focal length extremity.

9. (New) The method for focusing a zoom lens system according to claim 2, wherein the zoom lens system satisfies the following condition:

$$0.1 < (d_{12T} - d_{12W})/f_W > 0.3$$

wherein, $d_{12T}$ designates a distance between a most image-side surface of said first lens group and a most object-side surface of said second lens group at a long focal length extremity;

$d_{12W}$ designates a distance between the most image-side surface of said first lens group and the most object-side surface of said second lens group at a short focal length extremity; and $f_W$ designates a focal length of the zoom lens system at the short focal length extremity.

10. The method for focusing a zoom lens system according to claim 2, wherein the positive first lens group comprises three lens elements and the positive second lens group comprises two lens elements.

* * * * *